US009154067B2

(12) United States Patent
Frampton et al.

(10) Patent No.: US 9,154,067 B2
(45) Date of Patent: Oct. 6, 2015

(54) TORQUE SHARING ON PARALLELED GENERATORS

(71) Applicant: Kohler Co., Kohler, WI (US)

(72) Inventors: Isaac S. Frampton, Strattanville, PA (US); Douglas W. Dorn, Sheboygan Falls, WI (US)

(73) Assignee: Kohler Co., Kohler, WI (US)

( * ) Notice: Subject to any disclaimer, the term of this patent is extended or adjusted under 35 U.S.C. 154(b) by 4 days.

(21) Appl. No.: 14/134,684

(22) Filed: Dec. 19, 2013

(65) Prior Publication Data

US 2015/0180395 A1 Jun. 25, 2015

(51) Int. Cl.

| | |
|---|---|
| ***H02P 9/04*** | (2006.01) |
| ***H02P 9/00*** | (2006.01) |
| *F02N 11/06* | (2006.01) |
| *H02P 7/00* | (2006.01) |
| *H02J 3/46* | (2006.01) |
| *H02P 5/00* | (2006.01) |

(52) U.S. Cl.
CPC .. *H02P 9/04* (2013.01); *H02P 9/00* (2013.01); *H02J 3/46* (2013.01); *H02P 5/00* (2013.01)

(58) Field of Classification Search
USPC .................. 322/14; 290/41; 318/432; 475/5; 701/22, 55
See application file for complete search history.

(56) References Cited

U.S. PATENT DOCUMENTS

| | | | | |
|---|---|---|---|---|
| 2,986,647 | A | 5/1961 | Britten | 307/57 |
| 3,504,248 | A | 3/1970 | Miller | 318/561 |
| 4,164,661 | A | 8/1979 | Hucker et al. | 307/57 |
| 4,908,565 | A | 3/1990 | Cook et al. | 322/10 |
| 6,401,016 | B1 * | 6/2002 | Yoshino et al. | 701/22 |
| 6,441,506 | B2 | 8/2002 | Nakashima | 290/40 C |
| 6,653,744 | B2 | 11/2003 | Stricker | 290/6 |
| 7,006,906 | B2 * | 2/2006 | Kobayashi et al. | 701/22 |
| 7,164,247 | B2 * | 1/2007 | Joe et al. | 318/432 |
| 7,343,993 | B2 | 3/2008 | Dong et al. | 180/65.23 |
| 7,383,902 | B2 * | 6/2008 | Matsuzaki et al. | 180/65.285 |
| 7,426,973 | B2 * | 9/2008 | Matsubara et al. | 180/65.25 |
| 7,521,902 | B2 | 4/2009 | Wiegman et al. | 322/14 |
| 8,106,633 | B2 * | 1/2012 | Dozier et al. | 322/22 |
| 8,226,513 | B2 * | 7/2012 | Abe et al. | 475/5 |
| 8,358,036 | B2 * | 1/2013 | Dozier et al. | 307/84 |
| 8,912,672 | B2 * | 12/2014 | Pendray et al. | 290/41 |

(Continued)

FOREIGN PATENT DOCUMENTS

| | | | |
|---|---|---|---|
| DE | 102009033272 | | 1/2011 |
| WO | WO2012163979 | A2 | 12/2012 |
| WO | WO2013010577 | A1 | 1/2013 |

OTHER PUBLICATIONS

Generator Set KW & KVAR Load Sharing in a Paralleled System, accessed Dec. 18, 2013, http://www.fgwilson.ie/assets/files/technical_papers/generator-set-load-sharing-of-paralleled-generators.pdf.

(Continued)

*Primary Examiner* — Pedro J Cuevas
(74) *Attorney, Agent, or Firm* — Lempia Summerfield Katz LLC

(57) ABSTRACT

Torque is balanced among generators in a system of parallel generators. Control of the generators may be performed by one or more individual generator controllers or by a centralized controller. The torque on two or more generators is detected. The controller calculates a torque target based on the torque on the two generators or other operating characteristics of the system. The operation of at least one of the generators is controlled based on the torque target.

20 Claims, 6 Drawing Sheets

Controller
200
101a
101b
101c
Generator 1
Generator 2
Generator 3
204a
203a
Load 2
204b
203b
Load 3
202
206
203c
Load 1
105

(56) References Cited

U.S. PATENT DOCUMENTS

| | | | | |
|---|---|---|---|---|
| 8,926,381 | B2 * | 1/2015 | Haugland | 440/6 |
| 9,008,877 | B2 * | 4/2015 | Ando et al. | 701/22 |
| 2004/0163860 | A1 * | 8/2004 | Matsuzaki et al. | 180/65.2 |
| 2005/0075766 | A1 * | 4/2005 | Kobayashi et al. | 701/22 |
| 2006/0017414 | A1 * | 1/2006 | Joe et al. | 318/432 |
| 2007/0296358 | A1 * | 12/2007 | Sato et al. | 318/139 |
| 2010/0029428 | A1 * | 2/2010 | Abe et al. | 475/5 |
| 2010/0156191 | A1 * | 6/2010 | Dozier et al. | 307/81 |
| 2011/0285201 | A1 | 11/2011 | Peuser | 307/10.1 |
| 2012/0089270 | A1 * | 4/2012 | Dozier et al. | 700/295 |
| 2012/0175876 | A1 * | 7/2012 | Pendray et al. | 290/41 |
| 2012/0309242 | A1 * | 12/2012 | Haugland | 440/3 |
| 2013/0150197 | A1 * | 6/2013 | Lee et al. | 475/5 |
| 2013/0173108 | A1 | 7/2013 | Hashimoto | 701/22 |
| 2015/0069858 | A1 * | 3/2015 | Frampton | 307/127 |
| 2015/0076820 | A1 * | 3/2015 | Pendray et al. | 290/41 |
| 2015/0180280 | A1 * | 6/2015 | Frampton | 307/53 |
| 2015/0214864 | A1 * | 7/2015 | Sopko | 318/3 |

OTHER PUBLICATIONS

Olson, Paralleling Dissimilar Generators: Part 1—An Overview, 2010, Cummins Power Generation.

Olson, Paralleling Dissimilar Generators: Part 2—Compatible Alternators, 2010, Cummins Power Generation.

Olson, Paralleling Dissimilar Generators: Part 3—Load Sharing Compatibility, 2010, Cummins Power Generation.

Parallel Operation of Generators, accessed Sep. 18, 2013, Marine Files.

Zhang, Frequency-Load Control Based on Auto-Tuning Neurons for Ship Power Station, 2011, SciVerse ScienceDirect.

* cited by examiner

220

| Mode | Switch 214 | Generator 1 | Generator 2 |
| --- | --- | --- | --- |
| Without Torque Sharing | ON | 15 kW | 25 kW |
| | OFF | 15 kW | 15 kW |
| With Torque Sharing | ON | 20 kW | 20 kW |
| | OFF | 15 kW | 15 kW |

TORQUE SHARING ON PARALLELED GENERATORS

TECHNICAL FIELD

This disclosure relates in general to parallel generators, or more particularly, to a torque transfer between parallel generators.

BACKGROUND

Two or more generators may be connected in parallel (referred to as parallel (or paralleled) generators) to supply power to a home, business, vehicle, boat, or another entity. In some examples, the parallel generators may operate as a secondary source of power, and may be turned on in the event of a failure of another source of power. In other examples, a system of paralleled generators may be the primary source of power, such as in remote locations, in boats, or in other vehicles.

Parallel generators offer numerous advantages over systems powered with a single generator. A system of paralleled generators may incorporate multiple smaller generators in place of a more expensive and larger generator, which may require a larger footprint for installation than multiple smaller generators. Accordingly, the multiple smaller generators may allow for more flexibility in placement than one larger generator. Additionally, the system of paralleled generators may offer redundancy, which may provide a system with consistency and reliability. With multiple paralleled generators, if one of the parallel generators malfunctions, the load may be redistributed to the other generators immediately. The redundancy also allows for maintenance and repair to take place at one of the generators without disrupting the supply from the remaining paralleled generators. As another advantage, a system of parallel generators may be expanded incrementally as needs of the system increase.

In some arrangements parallel generators may encounter overload conditions at one or more generators. Challenges remain in minimizing the occurrence of power failures that may result from such overload conditions.

BRIEF DESCRIPTION OF THE DRAWINGS

Exemplary implementations are described herein with reference to the following drawings.

DETAILED DESCRIPTION

The following examples describe torque sharing techniques in a system of parallel generators including one or more engine-generator sets. An engine-generator set, which may be referred to as a generator or a genset, may include an engine and an alternator or another device for generating electrical energy. One or more of the generators may be towable generators, portable generators, marine generators, industrial generators, residential generators or other standby generators, or any type of generator.

One or more of the generators may be electrically coupled through wiring to a bus. A controller may automatically and individually generate switch commands to couple and decouple the generators from the bus. The controller may be internal to or connected with one or more of the generators, included in a standalone device, in or connected with another device such as an automatic transfer switch, or in various other devices, locations, or connections.

The parallel generators may be electrically coupled to a variable electrical load and/or a constant electrical load through the bus. The parallel generators may be mechanically coupled to a variable mechanical load and/or a constant mechanical load through a power take off (PTO). The electrical load, the mechanical load, or both may include multiple separate loads, any of which may be constant or variable, and any of which may be added or removed. As such, the variable load may vary in power demand based on variances in energy demanded by the load, by number or types of loads added or removed from the system, or both.

In one example, the mechanical load may be directly connected through gearing or another drive train to the shaft of an engine of one of a set of paralleled generators, and the electrical load may be connected to all of the generators through a bus. Through electrical power sharing, the electrical load may be balanced between the set of paralleled generators. However, the mechanical load may disrupt the balance. When the mechanical load is placed on one of the generators, the electrical power sharing may continue to balance the electrical load between the two generators. The additional mechanical load on the one of the generators may cause imbalance or overload the generator, which may result in a fault or a power failure. The following examples introduce torque sharing systems and methods (generally referred to as systems) in which the effective torque, dependent on any existing mechanical loads and any existing electrical loads, is balanced between parallel generators.

Figure 1:
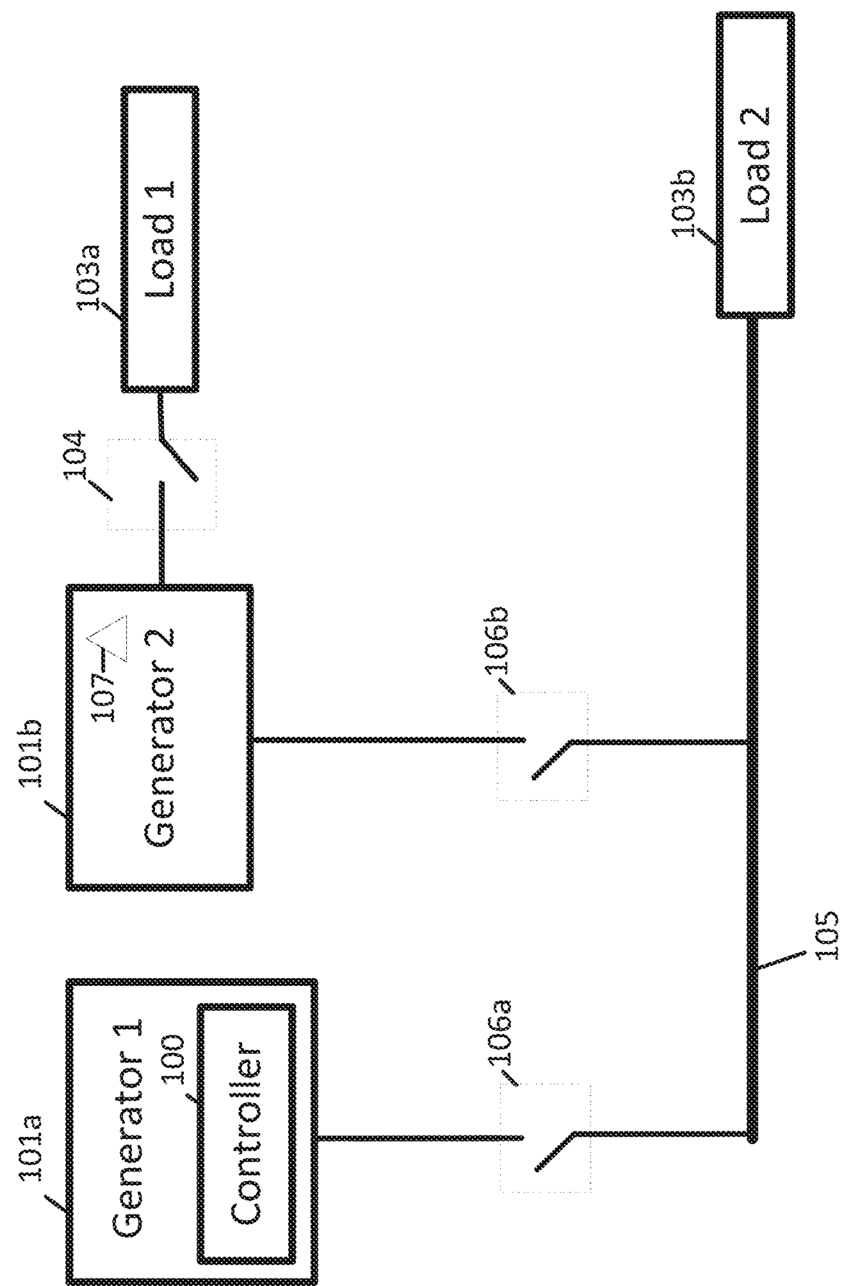
FIG. 1 illustrates an example system of parallel generators for torque sharing.

FIG. 1 illustrates an example system of parallel generators for torque sharing. The system may include a set of generators 101*a*-*b*, a mechanical load 103*a*, and an electrical load 103*b* connected to a generator bus 105. Each generator 101*a*-*b* may include an engine and an alternator or another device for generating electrical energy. Each of the generators 101*a*-*b* may be coupled to a switch 106*a*-*b*, which may control a connection of the generators 101*a*-*b* to the bus 105. When the switches 106*a*-*b* are closed, each respective generator 101*a*-*b* may supply electrical energy, such as from the alternators of the generators 101*a*-*b*, to the electrical load 103*b* through the bus 105. Generator 101*b* may be selectively connected to the mechanical load 103*a* through switch 104. Generator 101*b* may supply mechanical energy to the mechanical load 103*a*, such as from a PTO of the engine of the generator 101*b*, when the switch 104 is closed. Additional, different, or fewer components may be included.

A sensor 107 may be used to detect or identify the torque produced by the engine of generator 101*b*. The torque may be a mechanical torque produced by the consumption of fuels in the prime mover which rotates a rotor of the alternator. A similar torque may be a force applied to the crank shaft of the engine. The sensor 107 may gather or generate data indicative of the torque ("torque data"). The sensor 107 may, for example, measure the movement of crankshaft, the gear box, transmission, armature, rotor, or another component. The sensor 107 may be or include a torque sensor, a deflection sensor, a dynamometer, a positional sensor, a revolution sensor, a fuel injector sensor, or an air to fuel ratio (AFR) sensor. The torque sensor 107 may include a transducer, slip ring, rotating coil, or another component to measure the torque of the generator 101*b*.

The fuel injector sensor may measure a quantity of fuel supplied to the engine of the generator 101*b*. The quantity of the fuel may be determined based on a pulse width value of the fuel injector. The AFR sensor may measure the ratio of air to fuel in the engine of the generator 101*b*. The air flow through the engine may be calculated based on the ratio of air to fuel and the quantity of fuel. The torque output of the engine may be calculated from the air flow through the engine. The AFR sensor may be omitted.

The deflection sensor may measure a deflection of the crankshaft or another device. The deflection may be an angular deflection or a mechanical twist of the crankshaft. The deflection sensor may include two position sensors. The position sensors may be associated with different sides of the crankshaft. Based on a known torsional stiffness, the relative difference of data from the position sensors, a torque on the crankshaft may be calculated. As an example, the sensor 107 may be a positional sensor (e.g., position sensor or accelerometer) that may measure the change in rotation of a crankshaft or other component of generator 101*b*. The torque may be calculated based on the change in rotation. As another example, a revolution sensor may detect the number of rotations and/or the rotational acceleration of the crankshaft or other component of generator 101*b*. The torque may be calculated based on the number of rotations or the rotational acceleration. The revolution sensor may be a magnetic sensor that detects a change in a magnetic field, an optical sensor that detects indicia on the component, a contact sensor that detects a tab or protrusion on the crankshaft, or another component. A similar sensor may be included for generator 101*a*.

The controller 100 may receive or otherwise identify or gather the torque data for one, some, or all generators 101*a-b*. For example, the sensor 107 may send to a controller 100, or the controller 100 may otherwise identify or receive from the sensor 107, the gathered or generated torque data for the generator 101*b*. The controller 100 may also receive torque data for generator 101*a*, which may, for example, be gathered or generated by another sensor or accessed from a lookup table.

The controller 100 may identify or determine the torque produced by each of the generators 101*a-b* using the received torque data. In some systems, the torque data itself may be or represent a torque, and the controller 100 may thus identify or associate the torque data as the torque. In other systems, the torque data may be or represent a different parameter value (such as a shaft speed), and the controller 100 may use the torque data in one or more calculations to obtain the torque. As an example, the controller 100 may include a lookup table that associates torque values with the operating parameters of the generator 101*a*. The lookup table may provide the controller 100 torque as a function of load, frequency, and/or rotational speed. The controller 100 may look up the torque based on the received torque data (e.g. load, frequency, and/or rotational speed). In another example, the controller 100 may calculate the torque of generator 101*a* based on measurement of the loads connected to the generator 101*a*. Other examples are possible.

The controller 100 may calculate and/or generate driving commands for the generators 101*a-b* as a function of the torque data and/or determined torque. The controller 100 may calculate the total torque demanded or required across both generators 101*a-b* and both loads 103*a-b*. For example, the controller 100 may sum the torque on generator 101*a* and the torque on generator 101*b*. The controller 100 may determine an ideal allocation of the total torque between the generators 101*a-b*.

When the generators 101*a-b* are the same size or have the same power rating, the controller 100 may calculate the same torque target for each of the generators 101*a-b* by dividing the total torque evenly. Alternatively, the generators 101*a-b* may be different sizes or have different power ratings. In these cases, the controller 100 may calculate a shared percentage of rated torque or rated power for the generators 101*a-b*. The shared percentage is a weighted average or proration that distributes the torque between the generators 101*a-b* proportional to the respective rated outputs of the generators 101*a-b*. For example, where generator 101*a* has a rating twice as large as the rating of generator 101*b*, generator 101*a* will be controlled to produce twice the torque of generator 101*b*, regardless of the specific torque demanded. In addition or in the alternative, the allocation may be based on other information related to the system components, engine size, alternator ratings, bus wiring capacity, cooling system, exhaust system, fuel supply limitations or other factors.

The controller 100 may include a configuration file that describes the rated power or rated torque of the generators 101*a-b*. The configuration file may be generated when the generators 101*a-b* are installed. Alternatively, the configuration file may be generated automatically through detecting configuration settings set through a control panel including mechanical switches or an electronic interface. The controller 100 may detect whether the generators 101*a-b* have the same rating and may control the operation of the generators 101*a-b* to distribute the torque evenly. The controller 100 may additionally or alternatively detect whether the generators 101*a-b* have different ratings, and may control the operation of the generators 101*a-b* to distribute the torque proportionally to the respective ratings. In one example, the controller 100 may receive a user input from a switch or another command that selects torque sharing mode such that the generators 101*a-b* distribute torque evenly. When the torque sharing mode is not selected, or a power sharing mode is selected, the generators 101*a-b* distribute real power evenly without regard to the torque demanded by either generator.

The controller 100 may control the generators 101*a-b* and distribute the torque of the generators 101*a-b* by controlling the speed bias on the generators 101*a-b*. For example, the controller 100 may generate a speed command message or signal for each of the generators 101*a-b*. The command signal may be received at a governor control circuit that regulates the speed of the engine or another operating limit of the engine. In one example, the governor control circuit controls the operation of a throttle that increases or decreases the amount of fuel or air released into the manifold of the engine. The command message may be a digital signal or data packet received at an engine control unit (ECU). The command message may instruct the ECU to change the air to fuel ration or instruct a fuel injector to release more or less fuel in order to control the speed of the engine.

The generators 101*a-b* may be controlled by one or more controllers 100. The controller 100 may be, for example, a generator controller that is connected with a generator 101*a*, monitors one or more parameters of the generator 101*a*, and/or controls one or more operating parameters or aspects of the generator 101*a*. In one implementation, the generator 101*a* may include the only controller 100 of the system, and the controller 100 may act as a master for the system. In another implementation, the controller 100 may be separate from, and connected with, a number of generators. In another implementation, each of the generators 101*a-b* includes a controller 100. One of the controllers 100 may act as a master controller and the other controllers act as slave controllers. The master controller may instruct the slave controllers. The identity of the master controller may be constant and configured at installation, or may be set or adjusted at a later time automatically by the system or manually by a user. For example, the master controller may be the first controller to come online or close to the generator bus 105. In another implementation, the controller may be external to the generators.

Figure 2:
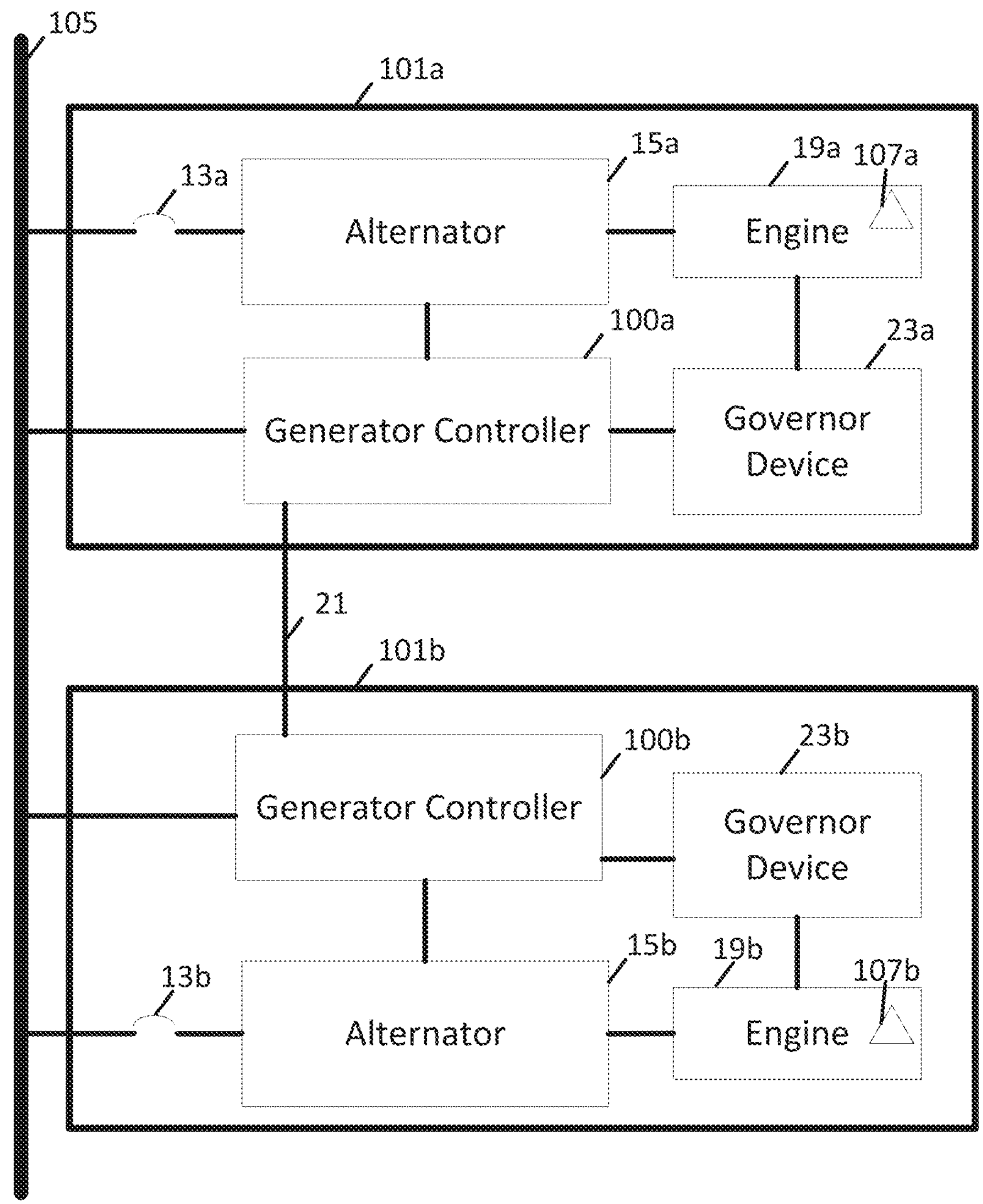
FIG. 2 illustrates an example generator controller and bus for a system of parallel generators.

FIG. 2 illustrates a detailed view of an example generator 101*a* and generator 101*b*. The generators 101*a-b* may be the same, similar, or different. The generators 101*a-b* may each include one or more of internal circuit breakers 13*a-b*, alternators 15*a-b*, generator controllers 100*a-b*, engines 19*a-b*, and sensors 107*a-b*. A communication line 21 may facilitate data communication between the generator controllers 100*a-b*. The communication may be wireless, Modbus or another protocol. A governor device 23*a-b* associated with each engine 19*a-b* may control the output speed or output torque of the engines 19*a-b*. The generators 101*a-b* may also include one or more of a fuel supply, a cooling system, an exhaust system, a lubrication system, and a starter. Additional, different, or fewer components and/or functionality may be included.

The alternators 15*a* and 15*b* may be electromechanical devices. The alternators 15*a* and 15*b* may include a rotating magnetic field and a stationary armature, a rotating armature with a stationary magnetic field, or a linear alternator. The engines 19*a* and 19*b* may be powered by gasoline, diesel fuel, or gaseous fuel. The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. Other variations are possible.

The torque sensors 107*a-b* may generate torque data regarding the operation of engines 19*a-b* and the current loads (both mechanical and electrical) on the generators 101*a-b*. The controllers 100*a-b* may exchange torque data through communication link 21. Each of the controllers 100*a-b* may perform an independent shared torque calculation or one of the controllers 100*a-b* may perform the shared torque calculation and report the result through communication link 21.

The torque data and the shared torque calculation may be performed every predetermined time interval. Example predetermined time intervals include 50 milliseconds, 100 milliseconds, 1 second, or another value. The torque data and the shared torque calculation may be performed in response to a change in any of the loads that exceeds a threshold (e.g., 1 newton meter, 1 kilowatt, 1 horsepower, or another value). The torque data and the shared torque calculation may be performed in response to user input or a user provided schedule, or at various other times.

The shared torque calculation may determine a torque target as a function of a current load on the first generator, a rating of the first generator, a current load on the second generator, and a rating of the second generator. The torque target may be a weighted averaged of the loads on the generators 101*a-b* based on the ratings of the generators 101*a-b* as shown by Equations 1-3. The total torque (TT) is the sum of the mechanical load on generator 101*a* ($Tmech_1$), the electrical load on generator 101*a* ($Telec_1$), the mechanical load on generator 101*b* ($Tmech_2$), and the electrical load on generator 101*b* ($Telec_2$). One or more of the loads may be zero. The torque target shared for the first generator ($TS_1$) is weighted by the rating of the first generator ($Tr_1$). The torque target shared for the second generator ($TS_2$) is weighted by the rating of the second generator ($Tr_2$). When both controllers 100*a-b* calculate the torque target and the targets are different (or when the difference between the targets exceeds a threshold level), the result may be averaged. Alternatively, one or both controllers may re-calculate the torque target to attempt to achieve closer results.

$$TT = Tmech_1 + Telec_1 + Tmech_2 + Telec_2 \qquad \text{Eq. 1}$$

$$TS_1 = \frac{Tr_1}{Tr_1 + Tr_2} TT \qquad \text{Eq. 2}$$

$$TS_2 = \frac{Tr_2}{Tr_1 + Tr_2} TT \qquad \text{Eq. 3}$$

The controllers 100*a-b* may generate control signals to regulate the operation of the engines 19*a-b* based on the shared torque values calculated in equations 2 and 3. For example, when the generator 101*a* is connected to an additional mechanical load, the controller 100 may recognize the additional mechanical load and use control signals that tend to increase the torque on generator 101*b* and decrease the torque on generator 101*a*. Accordingly, the generators 101*a-b* become more balanced and the frequency of the bus 105 is less prone to droop.

Either or both of the internal circuit breakers 13*a-b* may provide a protective relay function to the corresponding generator 101*a-b*. In one example, the protective relay function is reverse power protection. The internal circuit breakers 13*a-b* may be tripped in response to a threshold level of reverse power flow. In the torque sharing mode, the protective relay function may be disabled. When the protective relay function is disabled, paralleled generators may supply power to the first generator (e.g., generator 101*a* may supply power to the mechanical load 103*a* on generator 101*b*).

Figure 3:
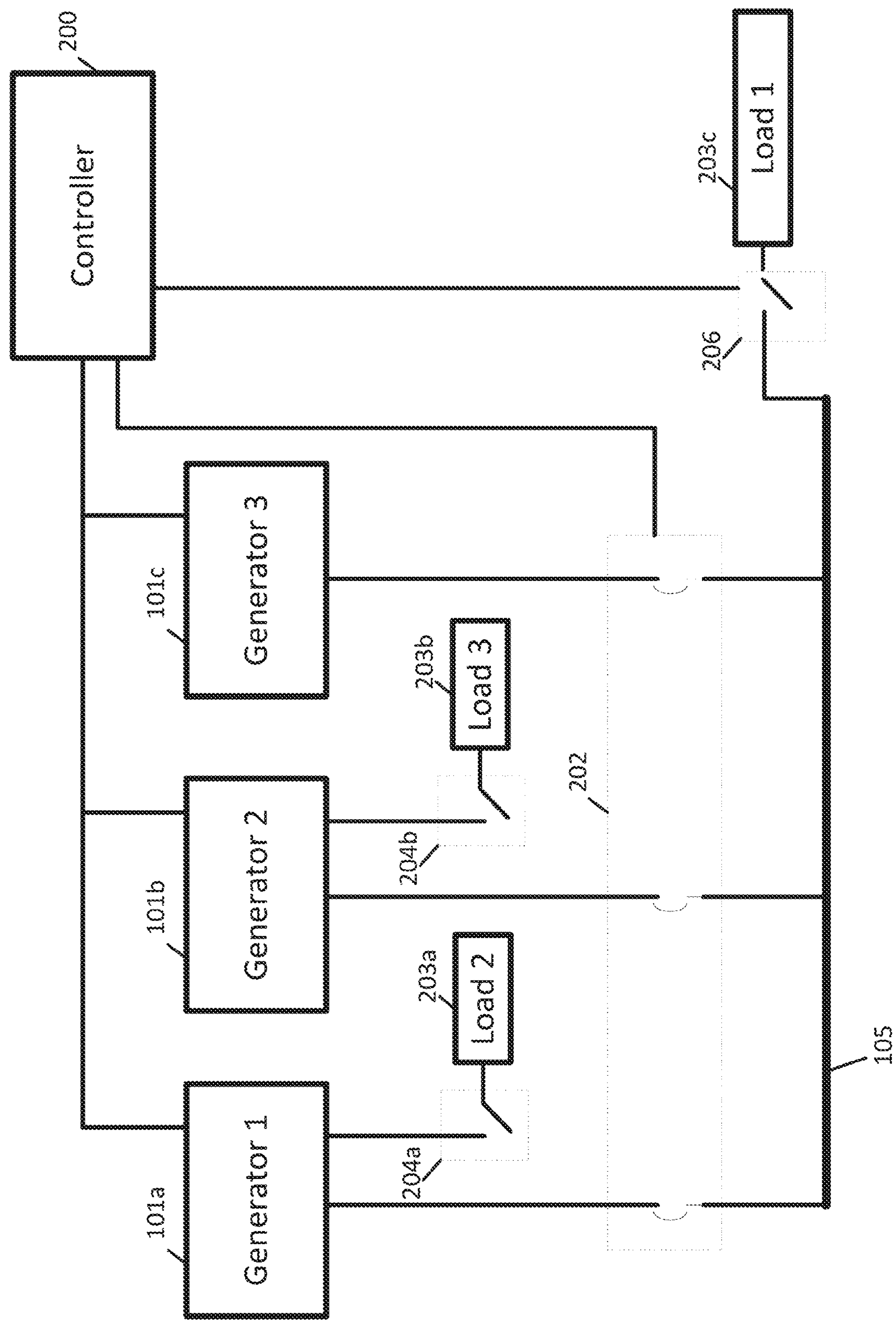
FIG. 3 illustrates an example system of parallel generators with a centralized controller.

FIG. 3 illustrates an example system of parallel generators with a centralized controller 200 for torque sharing. The centralized controller 200 may be coupled to each of one or more generators 101*a-c*, a generator switch array 202, and/or multiple load switches, such as a mechanical load switch array 204*a-b* for mechanical loads 203*a-b* and an electrical load switch 206 for electrical load 203*c*. Additional, different, or fewer components may be included. The centralized controller 200 may perform any of the functions described above with respect to controller 100.

One or more of the generators 101*a-b* may include a generator controller as described above. The communication between the generator controllers and the centralized controller 200 may include information about configuration of the generators including rated power or operation of the generators including current power or current torque. For example, the data communication may include configuration files reported from the slave generator controllers to the master controller. The data communication may also include the current speeds, frequency, voltage, current, torque or power of each of the generators reported to the other generators. The data communication may include the circuit breaker states of respective generators. The data communication may include availability signals, ready signals, and excitation commands send between generators 101*a-c* or the generator controllers during synchronization or other paralleling techniques to coordinate closing the generators 101*a-c* to the bus. Other variations are possible.

One or more of the mechanical loads 203*a-b* on the PTO may be a bow thruster, a hydraulic pump, a compressor, or a fan or another mechanically driven device. The bow thruster may be a transversal propulsion device designed to be integrated or mounted into the side of a ship to aide in maneuvering. The bow thruster may include an impeller, which may be driven in two directions depending on the desired maneuver for the ship.

The hydraulic pump may be part of a hydraulic drive system that uses pressurized hydraulic fluid to drive machinery. The hydraulic pump (driven by the engine) may pump hydraulic fluid from an intake pipe to an output pipe and into a hydraulic cylinder to transform the force of the hydraulic fluid over a large area into a high force over a small area. The compressor may drive an air conditioning unit, water chiller, or a refrigeration unit. The compressor may include a piston or other device to pump air into a chamber under pressure or an impeller to accelerator and decelerate air to pressurize it. The fan is another device for driving air with a propeller.

The centralized controller 200 may monitor the system and determine the loads on each of the generators using the torque sensors described above. Alternatively, the centralized controller 200 may monitor the switches on the generators 101*a-c* and the loads in order to determine the likely torque loads on the generators 101*a-c*. For example, when either or both mechanical load switches 204*a-b* are closed, then the centralized controller 200 may enter the torque sharing mode. Alternatively, when either or both mechanical load switches 204*a-b* are closed and the electrical load 206 is closed and the electrical load switch 206 is closed, then the centralized controller 200 may enter the torque sharing mode.

The active generators may be determined by the centralized controller 200 according to the switches in generator switch array 202. For example, when generators 101*a* and 101*c* are connected to the bus 105 and switch 204*b* and switch 206 is closed, the torque sharing calculation may calculate target torques for generators 101*a* and 101*c* based on the mechanical load 203*b*, the electrical load 203*c*, and power ratings for the generators 101*a* and 101*c*. When generators 101*a-c* are closed to the bus 105 and switches 204*a-b* and switch 206 are closed, the torque sharing calculation may calculate target torques for generators 101*a-c* based on the mechanical loads 203*a-b*, the electrical load 206, and power ratings for the generators 101*a-c*. The torque sharing calculation may calculate target torques for the online generators as a weighted average of the maximum or rated powers of the generators and the total load on the system.

As described above the torque sharing mode may be the default mode or automatically activated in certain circumstances. In one example, the centralized controller 200 may activate the torque sharing mode as a fail safe mode in response to a fault. The fault could be an overload condition on one of the generators 101*a-c*. The fault may be triggered when an operational characteristic of a generator exceeds a threshold. Example operational characteristics include temperature, frequency, coolant level, or lubrication level.

Figures 4A, 4B:
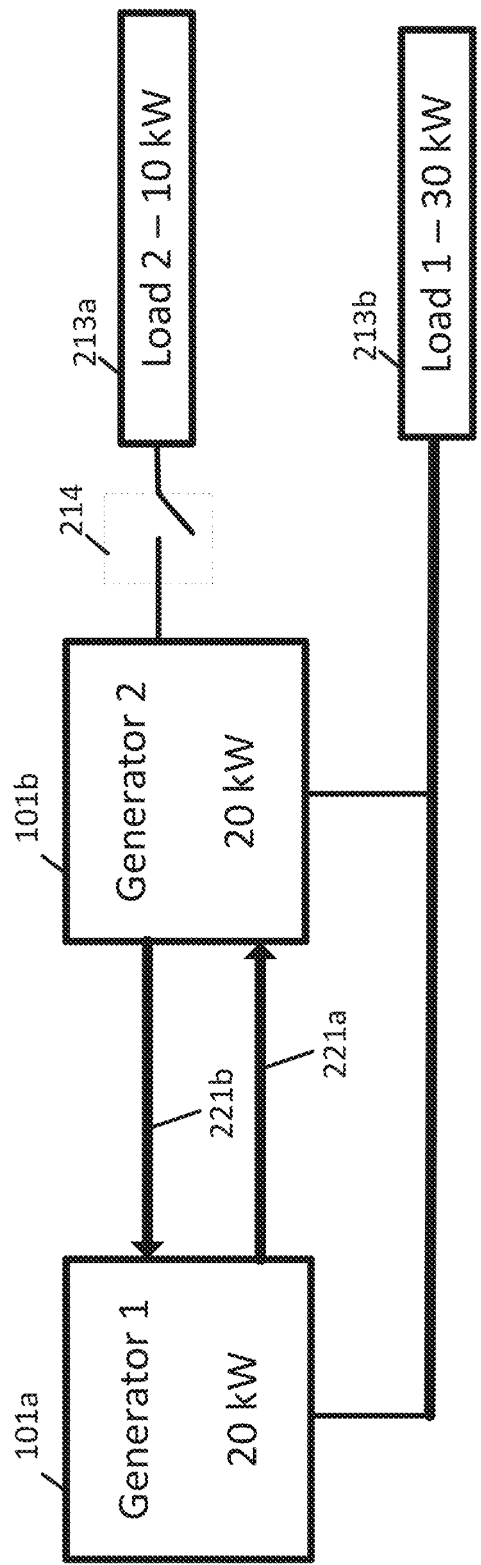
FIG. 4A illustrates an example implementation of parallel generators for torque sharing.
FIG. 4B illustrates a load table for the parallel generators of FIG. 4A.
Figure 5:
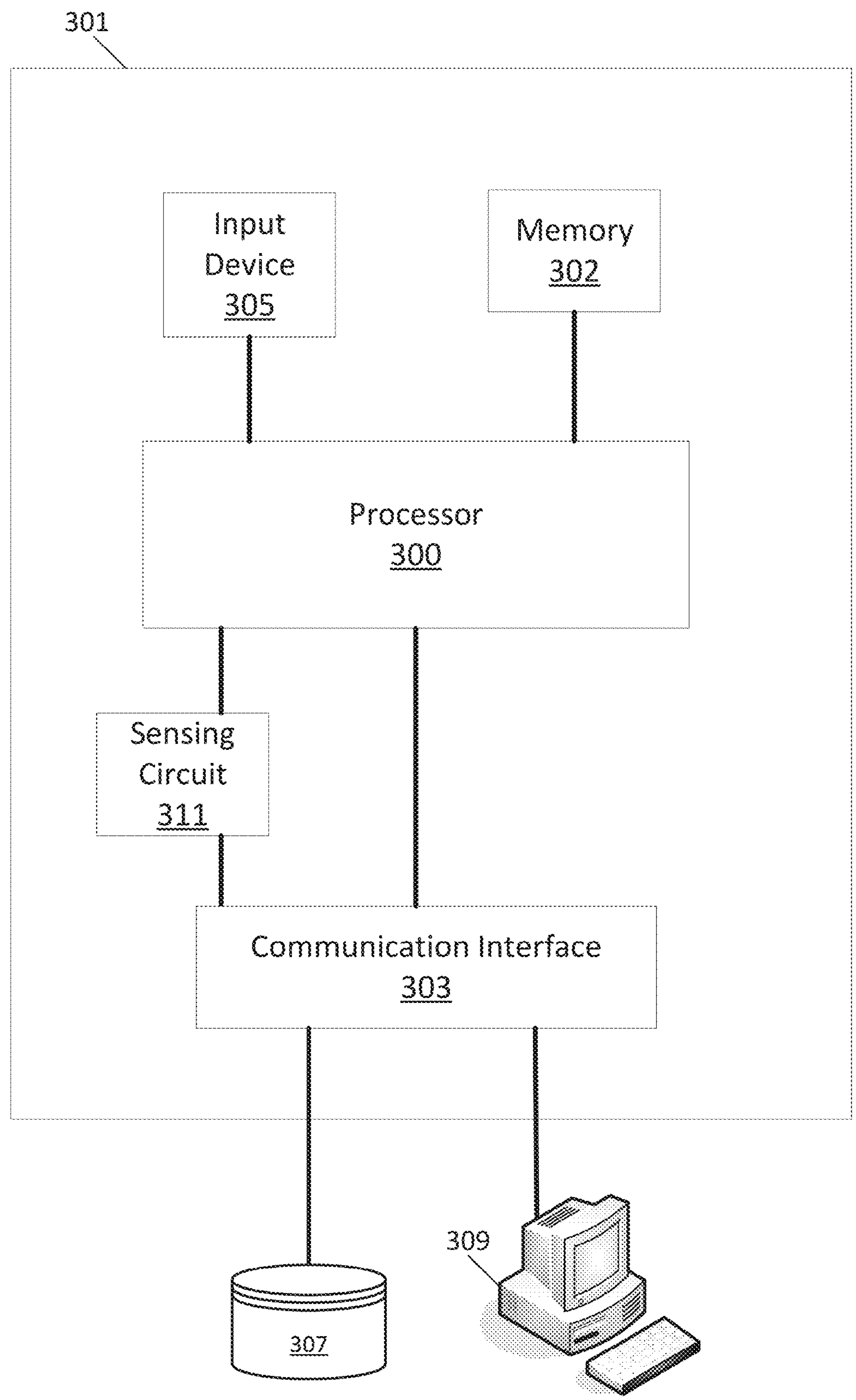
FIG. 5 illustrates an example controller of the systems of FIGS. 1-4.

FIG. 4A illustrates an example implementation, including example power ratings and levels, of the system of FIG. 1 for torque sharing for a system of paralleled generators 101*a-b*. Data communication may be exchanged between one or more controllers using communication links 221*a-b*. An electrical load 213*b* may be coupled to the generators 101*a-b* and a mechanical load 213*a* may be selectively coupled to the generator 101*b* via switch 214. FIG. 4B illustrates a load table 220 for the parallel generators 101*a-b*.

In the implementation of FIG. 4A, both generators 101*a* and 101*b* are rated at 20 kW. The mechanical load 213*a*, which may be variable over time, is 10 kW and the electrical load 213*b*, which also may be variable over time, is 30 kW.

Without torque sharing mode, and with the switch 214 open, no problems arise. The generators 101*a-b* may share the electrical load 213*b* substantially evenly, each generator having a load of approximately 15 kW. However, with the switch 214 closed, and no torque sharing mode, the generators 101*a-b* may continue to share the electrical load 213*b* but generator 101*b* may also carry the mechanical load 213*a* of 10 kW. This may cause an overload condition. Each generator may open the throttle or increase the speed of the engine through the governor. Over time generator 101*b* may be forced to run faster and generator 101*a* may be forced to run slower. Generator 101*b* may experience an overload condition, or the output of generator 101*b* may experience a decrease or droop in frequency, because 10 kW (the mechanical load 213*a*)+15 kW (the shared electrical load 213*b*)=25 kW, which is greater than the rated power of 20 kW for generator 101*b*.

This problem may be avoided using the torque sharing mode. With the torque sharing mode, one of the controllers above calculates a target torque based on the total torque of electrical load 213*b* and mechanical load 213*a*. Because the generators 101*a-b* have equal power ratings, the controller may assign the same target torque at 50% of the total torque and generates control signals for the generators 101*a-b* to operate at the target torque. Accordingly, the load on each of the generators 101*a-b* is balanced at 20 kW, and neither generator experiences an overload condition.

Figure 6:
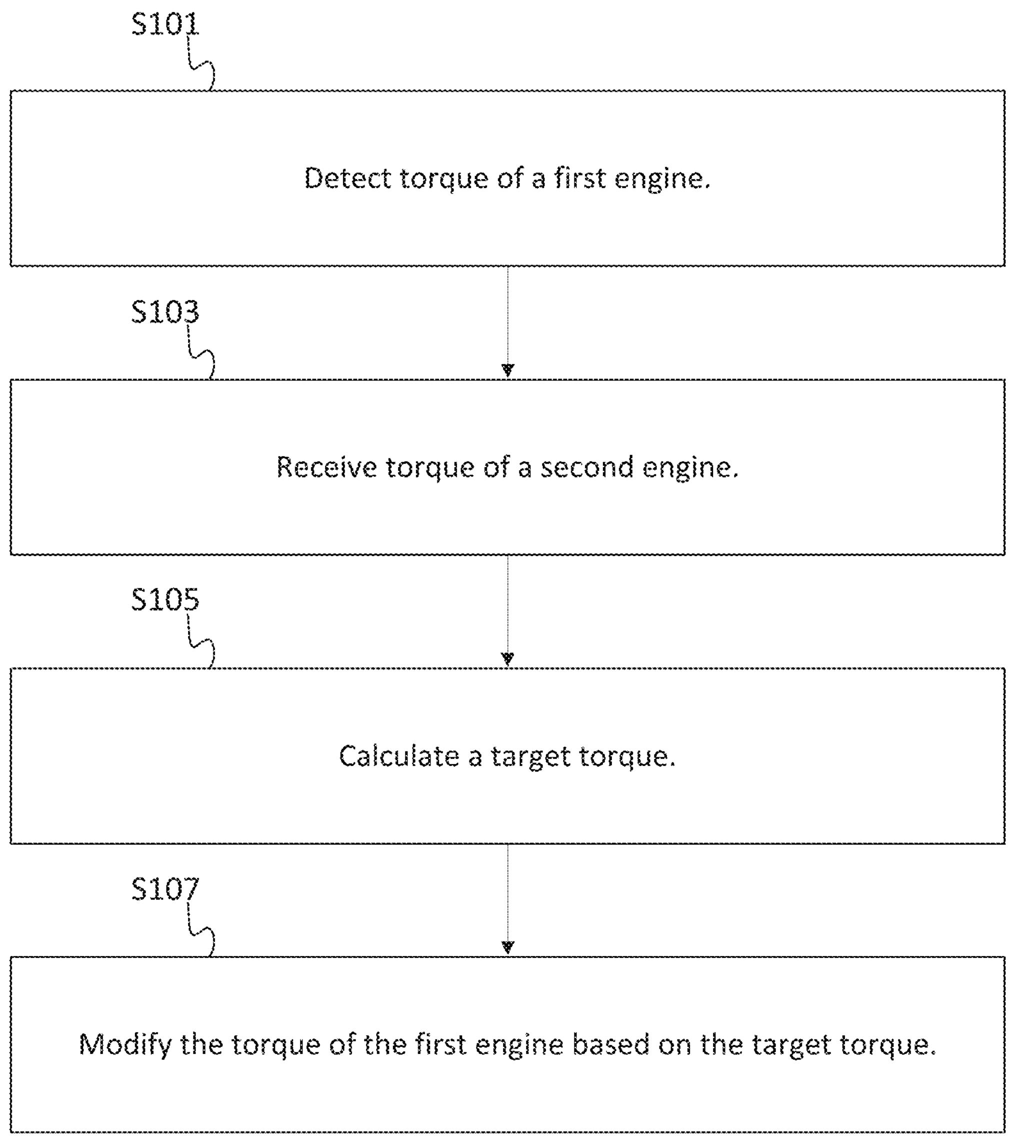
FIG. 6 illustrates example flowchart for torque sharing in paralleled generators.

FIG. 6 illustrates an example controller 301. The controller 301 may be the same, similar to, or different from the controllers 100 and 200, and may include the same, similar, or different components and logic. In one embodiment, the controller 301 is installed in an automatic transfer switch (ATS). The controller 301 may include a processor 300, a memory 302, and a communication interface 303. The controller 301 may be connected to a workstation 309 or another external device (e.g., control panel) and/or a database 307. Optionally, the controller 301 may include an input device 305 and/or a sensing circuit 311. Additional, different, or fewer components may be included.

The sensing circuit 311 may detect torque directly or indirectly. Sensors that detect torque directly measure the force or acceleration on a crankshaft or another component of the engine or alternator. Sensors that detect torque indirectly may measure the rotation of the crankshaft or the amount of fuel being released into the combustion chambers of the engine.

The communication interface 303 receives data indicative of a torque on a generator. The torque data may be received from the sensing circuit 311 or from another controller (e.g., a controller of another generator) or directly from sensors in other generators. In addition, the sensing circuit 311 may be omitted when the torque is inferred from predetermined load values, which may be entered via the input device 305, database 307, or workstation 309.

The processor 300 calculates a torque target based on the torque on the first generator and a torque of a second generator and generates a command for operation of the first generator based on the torque target. The torque target is a shared percentage of rated torque of the first generator and the second generator.

The processor 300 may generate command message to control the operation of the engines of the generators to increase or decrease the torque on the engines in order to approach the torque target. The processor may generate a first command to increase the torque on one generator based on the torque target and a second command to decrease the torque on another generator based on the torque target. The command messages may be in the form of a control signal for controlling governor circuits of the generators.

The controller 301 may be in communication with workstation 309 directly or through a network (e.g., the Internet). The workstation 309 may display data indicative of the torque sharing of the generators, data indicative of overload or fault conditions, and/or data indicative of the loads on the generators. The workstation 309 may display the operating status of one or more of the generator sets (e.g., output, excitation, synchronization). The workstation 309 may display the capabilities of the generators and the requirements of the connected loads.

FIG. 7 illustrates an example flowchart of the torque sharing operation for at least one of the controllers of FIGS. 1-5. The method in FIG. 7 may be described with respect to the controller 301, but any of the controllers may perform the acts of FIG. 7. The methods in FIG. 7 may, in some instances, be implemented as logic or software executable by a controller, such as controller 301. Additional, different, or fewer acts may be provided. The acts may be performed in the order shown or other orders. The acts may also be repeated.

At act S101, the controller 301 detects the torque of a first engine. The first engine may be part of a genset in parallel operation with another genset. The torque may be detected by a sensor, by analyzing data on the operation of the genset, or by inferring the torque based on the loads connected to the paralleled gensets.

At act S103, the controller 301 receives torque data for the other genset. The torque data may be received through data communications with the other genset. Alternatively, the torque data may be received from a sensor, from calculations based on other operating parameters of the other genset, from switch settings that describe the loads connected to the paralleled gensets.

At S105, the controller 301 calculates a target torque value. The target torque value based on the detected torque of the first genset and the received torque of the second engine. The controller 301 may generate a control signal for the first genset and/or the second genset as a function of the target torque.

For example, the control signal may be an input to a governor circuit and one or both of the engines of the gensets. The governor circuit may increase or decrease the supply of fuel to the engine, which increases or decreases the torque of on the engines. The engines may be controlled so that the torque is shared evenly. Alternatively, the target torque value depends on factory ratings for the gensets.

In one example, the controller 301 calculates at a predetermined interval at all times when the gensets are running, or in parallel operation. In another example, the controller 301 determines when to active calculation of the torque target values. The controller 301 may select a torque sharing mode based on in response to a fault or other operating parameter of the gensets. The torque sharing mode may be activated when one of the gensets surpasses a threshold of maximum output. Example thresholds include 80%, 95%, and 99%.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The centralized controller 200 and one or more generator controllers may be connected by a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 302 or database 307) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:

detecting or receiving data for a first torque on a first engine of a first generator;

detecting or receiving data for a second torque on a second engine of a second generator;

calculating a torque target based on the first torque and the second torque; and controlling operation of the first engine based on the torque target.

2. The method of claim 1, wherein the torque target is based on a sum of a load on the first generator and a load on the second generator, and based on a rating of the first generator and a rating of the second generator.

3. The method of claim 1, wherein the torque target is a weighted average of loads on the first and second generators.

4. The method of claim 1, further comprising:

increasing the torque on the first generator; and decreasing the torque on the second generator.

5. The method of claim 1, further comprising:

identifying a condition on the first generator or the second generator; and activating a torque sharing mode based on the condition.

6. The method of claim 1, wherein the first generator is connected to an electrical load and a mechanical load.

7. The method of claim 6, wherein the mechanical load is a pump, a compressor, or a bow thruster.

8. The method of claim 1, further comprising:

identifying the torque of the second generator based on a switch setting.

9. An apparatus comprising:

a communication interface configured to receive data indicative of a first torque on a first engine-generator set and receive data indicative of a second torque on a second engine-generator set; and a controller configured to calculate a torque target based on the first torque on the first engine-generator set and the second torque on the second engine-generator set and configured to generate a command for operation of the first engine-generator set based on the torque target, wherein the torque target is a shared percentage of rated torque of the first engine-generator set and the second engine-generator set.

10. The apparatus of claim 9, wherein at least a portion of the torque on the first engine-generator set is caused by a mechanical load.

11. The apparatus of claim 10, wherein the mechanical load includes one or more of a pump or a compressor.

12. The apparatus of claim 9, wherein the controller is configured to generate a first command to increase the torque on the first engine-generator set based on the torque target and a second command to decrease the torque on the second engine-generator set based on the torque target.

13. The apparatus of claim 9, wherein the controller is configured to generate a control signal for setting an operating limit of the first engine-generator set based on the torque target.

14. The apparatus of claim 9, wherein the controller is configured to activate a torque sharing mode including the torque target based on an operational characteristic of the first engine-generator set or the second engine-generator set.

15. The apparatus of claim 14, wherein the operational characteristic is temperature, load, or pressure of an engine of the first engine-generator set or the second engine-generator set.

16. A system comprising:

a sensor configured to detect a torque of a first engine;

a controller configured to calculate a target torque based on the detected torque of the first engine and a torque of a second engine and configured to generate a control signal for the first engine as a function of the target torque; and a governor circuit configured to increase or decrease the torque of the first engine according to the control signal.

17. The system of claim 16, wherein the sensor is a torque sensor, a dynamometer, a positional sensor, a revolution sensor, or an air to fuel ratio sensor.

18. The system of claim 16, wherein the target torque is calculated from a first power rating for a first generator coupled to the first engine and a second power rating for a second generator coupled to the second engine.

19. The system of claim 16, wherein the controller is configured to select a torque sharing mode based on an operational characteristic of the first engine and calculate the target torque in response to the torque sharing mode.

20. The method of claim 1, wherein the first torque or the second torque is measured by a torque sensor.

* * * * *